United States Patent
Wang et al.

(10) Patent No.: US 9,802,601 B2
(45) Date of Patent: Oct. 31, 2017

(54) VEHICLE AND METHOD FOR IMPROVING PERFORMANCE AT LOW BATTERY LIMITS

(75) Inventors: Qing Wang, Canton, MI (US); Ming Lang Kuang, Canton, MI (US); Carol Louise Okubo, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1180 days.

(21) Appl. No.: 13/541,106

(22) Filed: Jul. 3, 2012

(65) Prior Publication Data

US 2014/0012441 A1  Jan. 9, 2014

(51) Int. Cl.
| | |
|---|---|
| B60W 20/00 | (2016.01) |
| B60W 10/06 | (2006.01) |
| B60W 10/26 | (2006.01) |
| B60W 20/13 | (2016.01) |
| B60K 6/445 | (2007.10) |
| B60W 50/00 | (2006.01) |

(52) U.S. Cl.
CPC ............ *B60W 20/00* (2013.01); *B60W 10/06* (2013.01); *B60W 10/26* (2013.01); *B60W 20/13* (2016.01); *B60K 6/445* (2013.01); *B60W 2050/0012* (2013.01); *B60W 2050/0052* (2013.01); *B60W 2510/244* (2013.01); *B60W 2540/10* (2013.01); *B60W 2710/0677* (2013.01); *Y02T 10/6239* (2013.01)

(58) Field of Classification Search
None
See application file for complete search history.

(56) References Cited

U.S. PATENT DOCUMENTS

| | | | |
|---|---|---|---|
| 5,775,449 A | 7/1998 | Morotot et al. | |
| 6,019,183 A | 2/2000 | Shimasaki et al. | |
| 6,931,318 B2 | 8/2005 | Kaita et al. | |
| 7,104,349 B2 * | 9/2006 | Gray, Jr. | 180/65.245 |
| 7,578,364 B2 | 8/2009 | Ohno | |
| 7,677,341 B2 | 3/2010 | Tomo | |
| 2005/0246076 A1 * | 11/2005 | Chen et al. | 701/22 |
| 2008/0058154 A1 * | 3/2008 | Ashizawa et al. | 477/5 |
| 2009/0029828 A1 * | 1/2009 | Huang et al. | 477/115 |
| 2009/0294193 A1 * | 12/2009 | Okuno | 180/65.265 |
| 2010/0043414 A1 * | 2/2010 | Hirose | 60/320 |
| 2010/0087973 A1 * | 4/2010 | Kaita et al. | 701/22 |
| 2010/0152936 A1 * | 6/2010 | Wang et al. | 701/22 |
| 2011/0010031 A1 * | 1/2011 | Syed et al. | 701/22 |
| 2011/0072799 A1 * | 3/2011 | Bidner et al. | 60/286 |
| 2011/0111905 A1 * | 5/2011 | Tiwari et al. | 475/2 |

FOREIGN PATENT DOCUMENTS

CN   101508289 A   8/2009

* cited by examiner

*Primary Examiner* — Rami Khatib
*Assistant Examiner* — Nicholas K Wiltey
(74) *Attorney, Agent, or Firm* — David B. Kelley; Brooks Kushman P.C.

(57) ABSTRACT

A hybrid electric vehicle (HEV) includes an internal combustion engine, a traction motor, a generator, and a traction battery. Available electric power in the HEV is based upon the available power in the traction battery. The engine and the motor may both work simultaneously to propel the HEV. While the engine is powering the HEV, a controller is configured to increase a power output of the engine based upon a difference between available battery power and a combination of desired motor power and desired generator power.

16 Claims, 3 Drawing Sheets

VEHICLE AND METHOD FOR IMPROVING PERFORMANCE AT LOW BATTERY LIMITS

TECHNICAL FIELD

The present disclosure relates to a hybrid vehicle, and a method and system for controlling the powertrain of the hybrid vehicle.

BACKGROUND

In a hybrid electric vehicle (HEV), either or both of an internal combustion engine and an electric traction motor are capable of supplying power to the wheels of the vehicle. A traction battery is connected to the motor to provide electric power to the motor. In an electric assist mode, the engine and motor together provide power to meet driver torque demands. In an electric mode (EV-only mode), the engine is disabled while the battery and motor fulfill the driver torque demands. During the electric assist and EV-only modes, the availability of the electric power is directly tied to the available battery power.

Vehicle performance in response to aggressive acceleration requests may be degraded if the available battery power is low as typical control strategies rely on the faster response of the motor torque to satisfy such requests to meet desired energy efficiency goals. However, the torque delivered by the motor may be insufficient at low battery discharge limits and the engine may not respond quickly enough to satisfy the driver power demands. There is currently a need for a system that adequately meets driver power demands when the battery operates near low discharge limits.

SUMMARY

According to one embodiment of the present disclosure, a hybrid electric vehicle comprises an engine and a generator drivably connected to the engine. A traction battery is electrically connected to a traction motor and to the generator. A controller is configured to increase a power output of the engine while the engine is running, based upon a difference between available electric power and desired electric power. The available electric power is dictated by the battery state of charge. The desired electric power includes a combination of desired motor power and desired generator power.

Various embodiments include a system or method for controlling a vehicle having an engine, a traction motor, and an electrical energy storage device coupled to the traction motor that may include increasing power output of the engine at a rate that varies in response to available power from the electrical energy storage device when driver demanded power exceeds a corresponding threshold. The rate of increasing power output of the engine may vary based upon a difference between available power in the electrical energy storage device and a combination of desired motor power and desired generator power. The system or method may also include filtering the difference with an adjustable filter, wherein the filtering is adjusted based upon a discharge limit of the electrical storage device. In one embodiment, the filtering includes reducing the amount of filtering based upon the charge level of the electrical energy storage device being below a threshold.

Embodiments according to the present disclosure may also include preventing further increasing of the power output of the engine based upon the available power in the electrical energy storage device exceeding a charge limit. The rate of increasing power output of the engine may vary inversely with the available power from the electrical energy storage device.

Various embodiments according to the present disclosure have one or more associated advantages. For example, smooth adjustment of the engine power under operating conditions with low electrical power and normal electrical power does not require switching between operating modes. As such, operation under normal electrical power availability or state of charge is not affected. However, performance under low electrical power is improved.

The above advantages and other advantages and features will be readily apparent from the following detailed description of the preferred embodiments when taken in connection with the accompanying drawings.

DETAILED DESCRIPTION

Detailed embodiments of the present invention are disclosed herein. It is to be understood that the disclosed embodiments are merely exemplary of the invention that may be embodied in various and alternative forms. The Figures are not necessarily to scale; some features may be exaggerated or minimized to show details of particular components. Specific structural and functional details disclosed herein are therefore not to be interpreted as limiting, but merely as a representative basis for teaching one skilled in the art to variously employ the present invention. As those of ordinary skill in the art will understand, various features of the embodiments illustrated and described with reference to any one of the Figures may be combined with features illustrated in one or more other Figures to produce embodiments that are not explicitly illustrated or described. The combinations of features illustrated provide representative embodiments for typical applications. However, various combinations and modifications of the features consistent with the teachings of the present disclosure may be desired for particular applications or implementations. The representative embodiments used in the illustrations relate generally to systems and methods for adjusting total engine power to meet driver demands when battery discharge limits are low. However, the teachings of the present disclosure may also be used in other applications. Those of ordinary skill in the art may recognize similar applications or implementations with other vehicle configurations or technologies.

Figure 1:
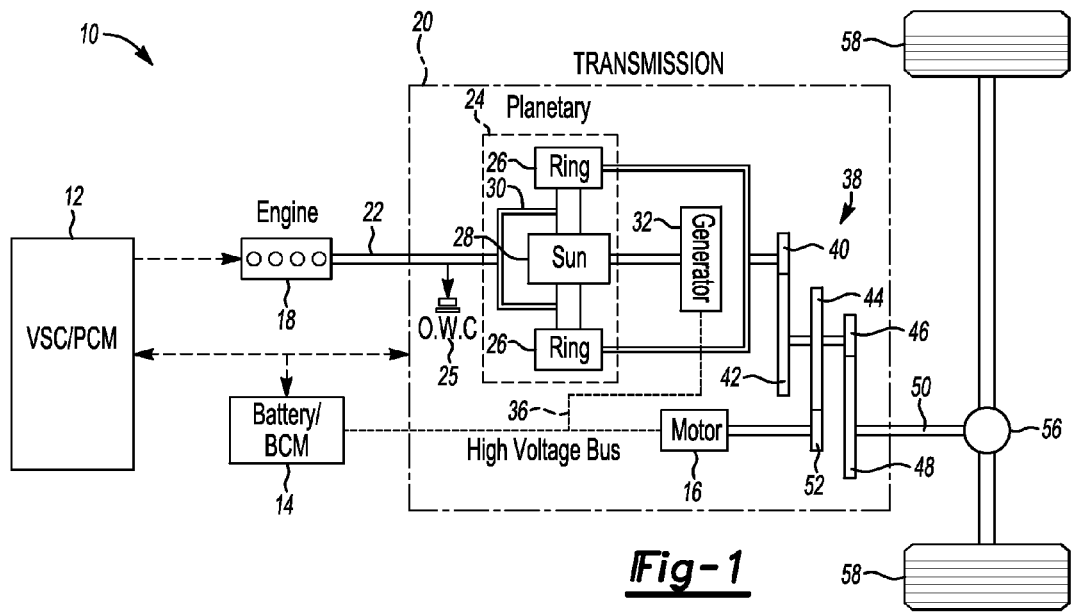
FIG. 1 is a schematic representation of a power-split hybrid electric vehicle according to various embodiments of the present disclosure.

Referring to FIG. 1, a hybrid electric vehicle (HEV) includes a power-split powertrain 10. A vehicle system controller (VSC) and powertrain control module (PCM) 12 control an electric energy storage device, or an electric traction battery 14. The electric energy storage device may be any device that is capable of storing electric energy and transmitting the energy to propel the vehicle. The battery 14 is merely one example, and other examples are contemplated, such as fuel cells. It should be understood that controller 12 may be one controller, or may be a system of controllers in a control area network (CAN) with a computer and a central processing unit (CPU) designed to allow several controllers to communicate with each other throughout the vehicle. The battery 14 has a two-way electrical connection, whereby it receives and stores electric energy and also supplies the energy to an electric traction motor 16. The controller 12 also controls the operation of an internal combustion engine (ICE) 18. Both the motor 16 and the engine 18 are capable of powering a transmission 20 that ultimately delivers torque to the wheels of the vehicle.

While the HEV of FIG. 1 is a power-split hybrid, it is contemplated that the present disclosure may also apply to a parallel-type hybrid in which an engine, a motor, and a transmission are connected in series by clutches that control which of the engine and/or motor drives the transmission. It should be understood that the present disclosure may apply to any hybrid vehicle that involves an engine and a motor, and the power-split powertrain 10 is illustrated as one possibility.

The engine 18 delivers power to a torque input shaft 22 that is connected to a planetary gear set 24 through a one way clutch 25. The planetary gear set 24 includes a ring gear 26, a sun gear 28, and a planetary carrier assembly 30. The input shaft 22 is driveably connected to the carrier assembly 30 to power the planetary gear set 24. The sun gear 28 is driveably connected to a generator 32. The generator 32 may be engaged with the sun gear 28, such that the generator 32 may either rotate with the sun gear 28, or not rotate with it. When the one way clutch 25 couples the engine 18 to the planetary gear set 24, the generator 32 generates energy as a reactionary element to the operation of the planetary gear set 24.

Electric energy generated from the generator 32 is transferred to the battery 14 through electrical connections 36. The battery 14 also receives and stores electric energy through regenerative braking, in known fashion. The battery 14 supplies the stored electric energy to the motor 16 for operation. The battery 14, motor 16, and generator 32 are each interconnected in a two-way electric flow path through electrical connections 36.

The vehicle can be powered by the engine 18 alone, by the battery 14 and motor 16 alone, or by a combination of the engine 18 with the battery 14 and motor 16. In a first mode of operation, the controller 12 activates the engine 18 to deliver torque through the planetary gear set 24. The ring gear 26 distributes torque to step ratio gears 38 comprising meshing gear elements 40, 42, 44, and 46. Gears 42, 44, and 46 are mounted on a countershaft, and gear 46 distributes torque to gear 48. Gear 48 then distributes torque to a torque output shaft 50. The controller 12 may also activate the motor 16 to assist the engine 18. When the motor 16 is active in assisting, gear 52 distributes torque to gear 44 and to the countershaft. In a second mode of operation, or EV mode, the controller 12 disables the engine 18 or otherwise prevents the engine 18 from distributing torque to the torque output shaft 50. In the second mode of operation, the battery 14 powers the motor 16 to distribute torque through the step ratio gears 38 and to the torque output shaft 50. The torque output shaft 50 is connected to a differential and axle mechanism 56 which distributes torque to traction wheels 58.

To summarize, there are two power sources for the driveline. The first power source is the engine 18, which delivers torque to the planetary gear set 24. The second power source is the electric drive system, which includes the motor 16, the generator 32 and the battery 14, where the battery 14 acts as an energy storage medium for the generator 32 and the motor 16. The generator 32 may be driven by the planetary gear set 24, and may alternatively act as a motor and deliver power to the planetary gear set 24.

The controller 12 controls the battery 14, engine 18, motor 16 and generator 32 in order to distribute torque to the wheels 58 in either the first mode of operation or the second mode of operation. The controller 12 receives input from many sources, including accelerator pedal position, brake pedal position, steering wheel position, climate control, battery state of charge, and auxiliary needs. Using these inputs, the controller 12 is programmed to disable the engine 18 when mechanical power is not needed to fulfill all of the power demands of the vehicle. Furthermore, the controller 12 decides if either or both power sources should be active to distribute torque to the wheels.

Figure 2:
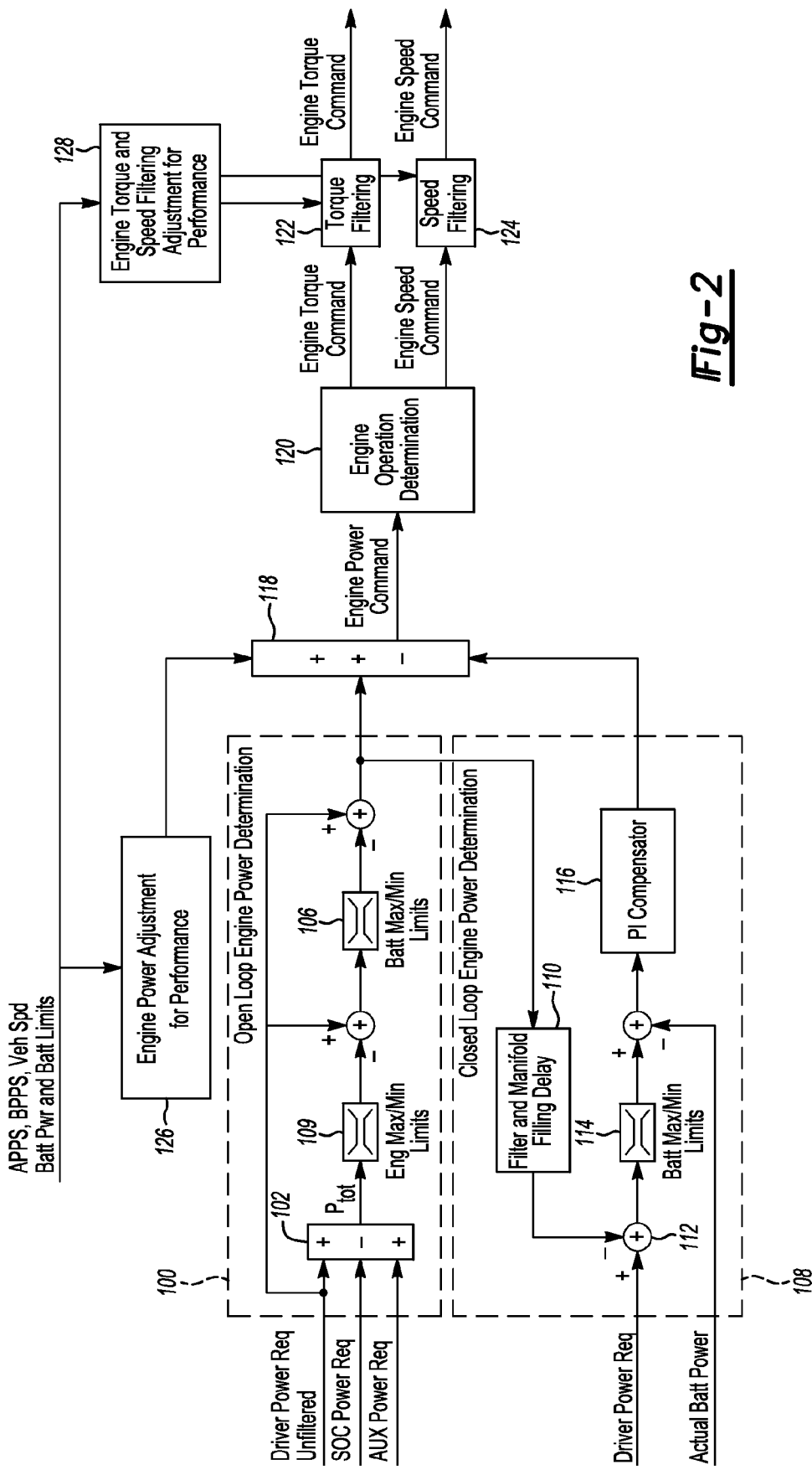
FIG. 2 is a flow chart of an overall system controlling engine torque and speed according to various embodiments of the present disclosure.

Referring to FIG. 2, a control system utilized by controller 12, for example, is illustrated with the engine 18 and motor 16 both actively power the HEV. A desired engine power determination is first decided in an open loop engine power determination 100. During normal operation, the total power desired from the engine ($P_{tot}$) is the sum of unfiltered desired power requests at the wheels, the desired charge/discharge power for state of charge (SOC) maintenance, and the auxiliary (AUX) power requests, shown at 102. The desired engine power ($P_{tot}$) is then clipped at 104 to be bound within maximum and minimum engine power capabilities. $P_{tot}$ is then clipped again at 106 to keep the expected battery power within the charge and discharge limits. The output of the open loop is the feed forward engine power command.

A desired engine power determination is then decided in a feedback closed loop engine power determination 108. The feedback loop first filters the feed forward engine power command at 110 from the open loop engine power determination at 100. An expected engine power is then computed from delaying the filtered engine power command. A target battery power is determined at 112 defined as the difference between the expected engine power and the desired power request at the wheels. The target battery power is then clipped at 114 to set the target battery power within the charge and discharge limits of the battery 14. An error or difference between the target battery power and the actual battery power is determined and used as a control in a PI compensator 116. The PI compensator 116 then adjusts the feed forward open loop engine power determination 100 accordingly. The total engine power command is then determined 118 as the sum of the feed forward and feedback terms.

The total engine power command is an input into the engine operation determination at 120. The controller 12 determines whether or not engine output is needed to fulfill driver demand and to what amount, and commands the engine to provide power accordingly. This is done so by sending signals representative of an engine torque command and an engine speed command. Each of the commands is filtered at 122 and 124, respectively. The filtered torque and speed commands are finally outputs of the control system, and are sent to the engine 18. Once the engine 18 receives the filtered engine torque and speed command signals, the engine 18 works to provide sufficient power to fulfill driver demands along with the electric motor 16 and battery 14.

Using this exemplified system, the performance of the HEV can be drastically compromised when operated under conditions in which the battery 14 has a low discharge limit. For example, if an electrical leak within the vehicle causes the available battery power to be low or close to zero, the amount of torque the motor 16 can deliver to the wheels 58 is reduced considerably below its capability. For instance, the motor torque delivered at low discharge limit can be 100+NM less than operated at normal discharge limits. This negatively impacts the HEV's acceleration when both the engine 18 and motor 16 are powering the HEV. There may also be a lagging response in the HEV, in that the engine 18 lags behind the acceleration demands of the driver when the battery discharge limits are low.

Considering the problems with low battery discharge limits, an engine power adjustment at 126 is implemented into the control system. The engine power adjustment 126 is added the engine power command determination at 118 when the battery 14 is operating at a low discharge limit. Furthermore, the engine torque and speed filtering is adjusted at 128 to allow more flexibility in the filtering when battery discharge limits are low. The adjustments at 126 and 128 are aimed to command extra engine power to boost maximum HEV performance at low battery power levels, while speeding up the engine response time such that maximum motor torque requested by the control system can still be fulfilled by increasing engine power. The engine power adjustments 126 and filtering adjustments 128 are described in more detail with reference to FIGS. 3 and 4.

Figure 3:
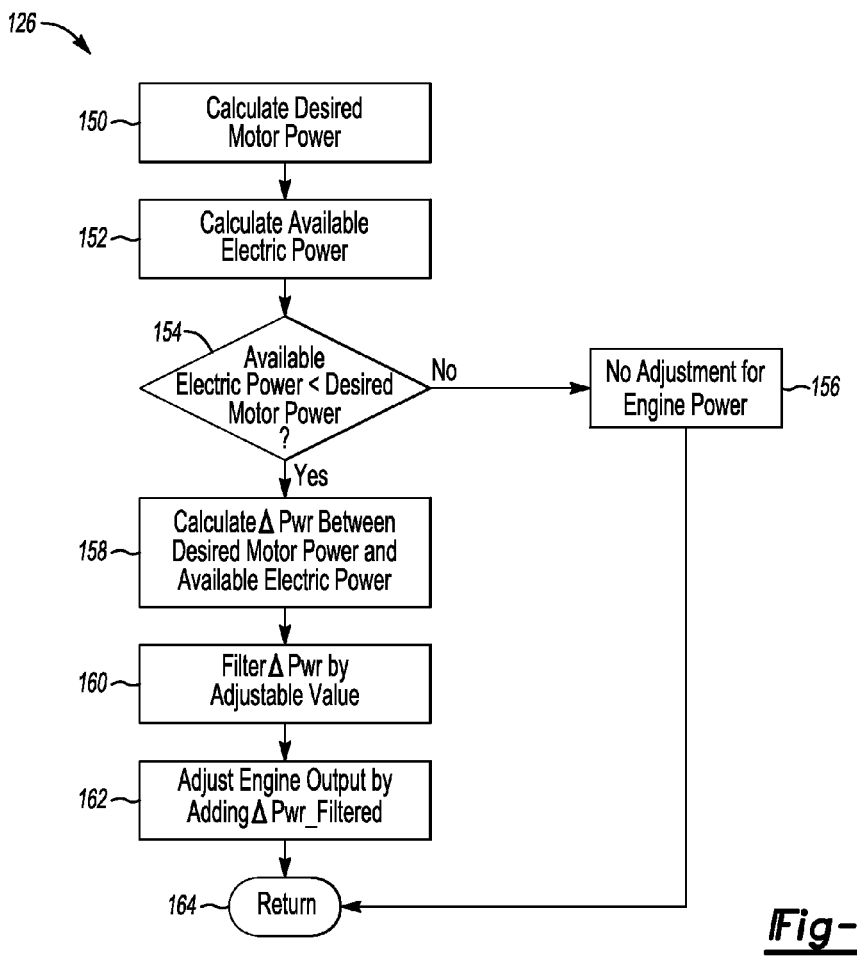
FIG. 3 is a flow chart illustrating an adjustment of engine output power according to various embodiments of the present disclosure.

Referring to FIG. 3, an overview of one embodiment of the engine power adjustment 126 is illustrated. A more detailed description is provided in the embodiment of FIG. 4. At 150, the raw desired motor power is determined. The raw desired motor power represents how much power from the motor 16 is desired to power the wheels 58. The available electric power in the battery 14 is then calculated at 152. This can be done by simple metering of the discharge limit of the battery 14. Such information may also be visually relayed to the operator of the HEV.

At 154, the available electric power is compared with the calculated desired motor power. This step ensures the desired motor power can be fulfilled by electric power, without additional engine power commands. If the available electric power exceeds the desired motor power, then there is no adjustment for the engine power at 156, and the battery 14 provides sufficient power to the motor 16. However, if the available electric power is less than the desired motor power, a power adjustment of the output of the engine 18 will be commanded by the controller 12 as shown in steps 158-162.

At 158, the difference between the desired motor power (from step 150) and the available electric power is calculated. This difference is referred to as a delta power (ΔPwr). ΔPwr is a feed forward term that represents the amount of power that the motor 16 desires that the battery 14 cannot provide. ΔPwr further represents a factor in the amount of power that needs to be supplemented by the engine 18 in order to meet driver power demands.

Before adjusting the engine power output, the ΔPwr signal is filtered and smoothed by filters and/or rate limit functions at 160. This is to prevent sharp spikes in the engine power for drivability considerations. The filtering and/or rate limiting also prevents potential power spikes sent from the engine 18 through the generator 32 and into the battery 14, which could lead to overcharging of the battery 14. The filtering and rate limiting impact on ΔPwr may be adjusted as a function of the available electric power in the battery 14. For example, if the available power in the battery 14 is low, the filtering and rate limiting are adjusted to impact ΔPwr less, as overcharging of the battery 14 becomes less of an issue.

After filters and rate limits are placed on ΔPwr, the controller 12 commands the engine 18 to output more power at 162 by an amount equal to $\Delta Pwr_{filtered}$. This increase in the engine power supplements the deficiencies in the battery power, which is especially helpful when the discharge limit of the battery 14 is extremely low. The power output of the engine 18 works to provide mechanical power to the wheels 58 through the transmission 20, and also works to provide power to the generator 32 which in turn charges the battery 14 and powers the motor 16. The system returns at 164 to continuously provide a engine power adjustment. This control system more intelligently schedules engine power to timely meet the maximum desired torque at the wheels 58 while the battery 14 is insufficiently charged. Overall drivability of the HEV is thus improved, as the HEV drives more like a conventional non-HEV when battery discharge limits are low.

Figure 4:
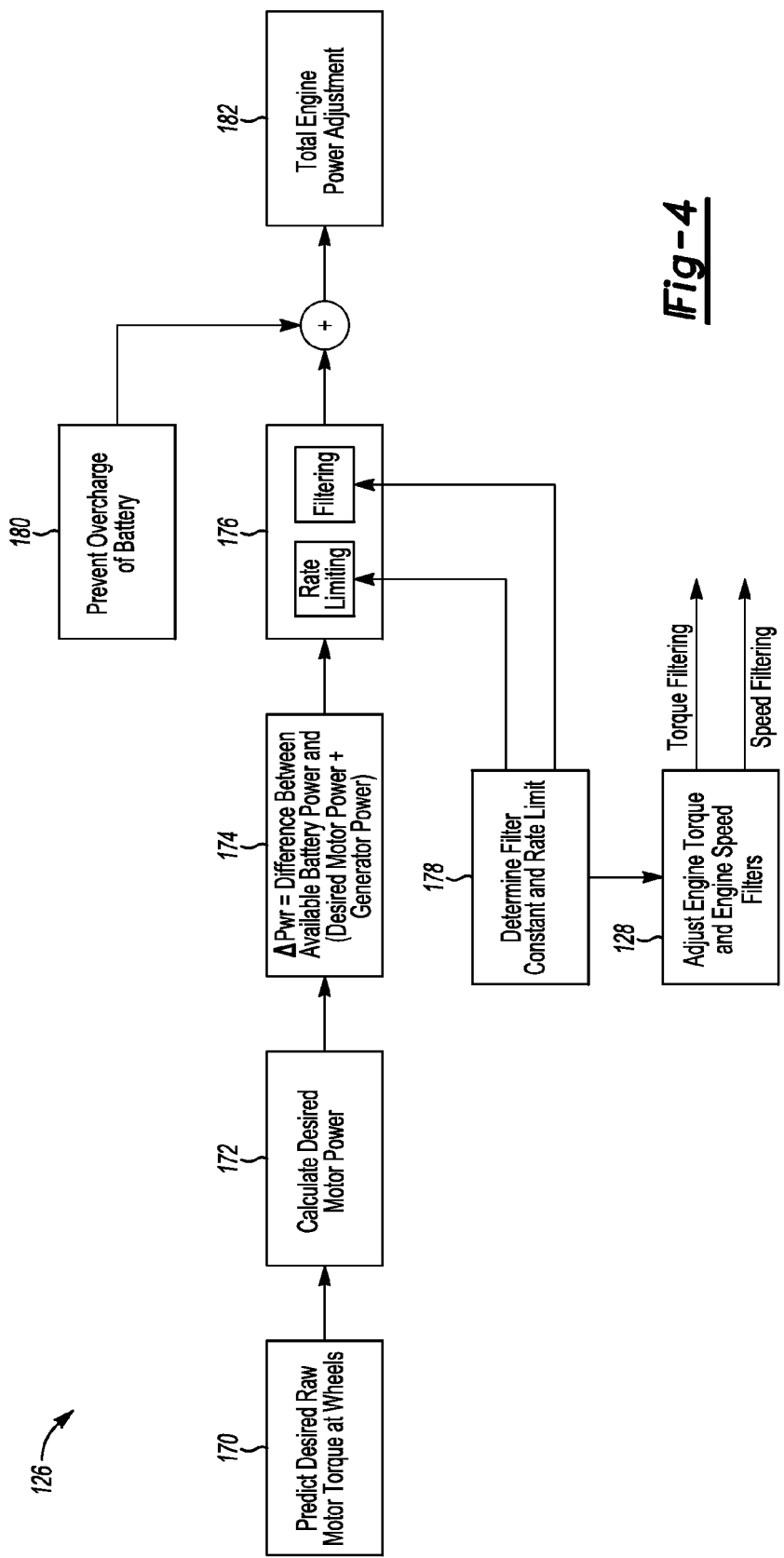
FIG. 4 is a more detailed flow chart illustrating total engine power adjustment when battery discharge limits are low according to various embodiments of the present disclosure.

Referring to FIG. 4, a more detailed flowchart of one embodiment of the control system is illustrated. References to the structure of FIG. 1 of a power-split HEV are also made for a structural example. At 170, the raw desired motor torque at the wheels 58 is determined. In the power-split HEV illustrated in FIG. 1, the motor torque and the mechanical torque flow through the planetary gear set 24 both contribute to the total torque at the wheels 58. The predicted motor torque can be represented by the following:

$$\tau_{m\_predict} = \frac{T_2}{T_g}\tau_{drive\_sh} - T_1 T_2 \frac{1}{\rho}(\tau_g - J_{gen\&sun}\dot{\omega}_g) + J_{mot\_lumped}\dot{\omega}_m \quad (1)$$

where $T_g$ is the gear ratio between gear 46 and gear 48, $T_1$ is the gear ratio from gear 42 to gear 40, $T_2$ is the gear ratio from gear 52 to gear 44, $\rho$ is the planetary gear ratio between the sun gear 28 and the ring gear 26, $\tau_g$ is the torque of the generator 32, $J_{gen\&sun}$ is the lumped moment of inertia of a rotor of the generator 32 and the sun gear 28, $\dot{\omega}_m$ is a time derivative of the rotational speed of the motor 16, and $\dot{\omega}_g$ is a time derivative of the rotational speed of the generator 32. Furthermore, the predicted motor torque at the wheels can be represented by the following:

$$\tau_{m\_predict@wh} = \tau_{drive\_sh} + J_{mot\_lumped}\dot{\omega}_m \text{GearRatio}_2 - \text{GearRatio}_1(\tau_g - J_{gen\&sun}\dot{\omega}_g) \quad (2)$$

where $\text{GearRatio}_1$ is the gear ratio from the motor 16 to the wheels 58, and $\text{GearRatio}_2$ is the gear ratio from the generator 32 to the wheels 58 and $\tau_{drive\_sh}$ is the torque of the driveshaft.

To comply with the power control architecture of the control system, the signal indicative of the predicted motor torque at the wheels ($\tau_{m\_predict@wh}$) is converted into a power signal at 172. This is done by multiplying $\tau_{m\_predict@wh}$ by the rotational speed of the wheels 58. The motor power signal is then clipped so that the motor power does not increase beyond a maximum limit as governed by the specifications of the motor 16. The clipping of the motor power signal also makes it unnecessary to request more engine power to be sent to the motor 16 if the motor 16 is working at its maximum limit. The result of the power conversion and the clipping yields a predicted (or desired) motor power.

At 174, ΔPwr is determined. ΔPwr represents the difference between the available electric power, and the combined electric power desired by the motor 16 and generator 32. The available electric power is the metered discharge limit of the battery 14, indicating how much power the battery 14 can provide to the electric components of the drivetrain. The desired generator power is determined by the multiplication of a generator torque command and the generator speed. ΔPwr is a feed forward term that represents the amount of power that the motor 16 and generator 32 desire that the battery 14 cannot provide. Therefore, ΔPwr is also a factor in determining the amount of power that needs to be supplemented by the engine 18 in order to meet the power demands of the motor 16. The supplementing of engine power is critical in moments of sharp accelerations, for example, as the motor 16 cannot adequately provide an immediate boost of torque due to low battery discharge levels. Torque and power demands by the operator are met by immediately increasing engine power to meet the power deficiencies in the battery 14.

Depending on the aggressiveness of the accelerator pedal input, ΔPwr can be drastic at sharp tip-ins. Therefore, before adjusting the power output of the engine 18, the ΔPwr signal passes through rate limiting, filtering, and clipping. First, at 176, rate limiting and filtering functions are utilized to smooth the ΔPwr term. This dampens the sharp spikes in ΔPwr, which in turn prevents the engine 18 from dangerously and abruptly increasing its power output to high levels. Rate limiting and filtering functions that may already be implemented into the controller 12 for smoothing other signals may be applied to smooth the ΔPwr signal.

Adjustable filter constants and rate limits that are implemented in the control system at 176 are determined at 178. The filter constants and rate limits are adaptively scheduled as functions of a ΔDischargPwr, which represents the difference between the instant discharge limit and the normal discharge limit of the battery 14. For example, when the ΔDischargPwr is small, the ability of electric assist to the driveline is high because of a high discharge limit of the battery 14. In these cases, the filter constants and rate limiting values are slow to heavily smooth the ΔPwr signal. By contrast, when the ΔDischargPwr is big, fast filtering and rate limiting should be implemented so that performance is adequately satisfied at low battery discharge limits. Rapid engine response is more acceptable at low battery discharge limits for quicker acceleration, because not only is the motor 16 unable to sufficiently fulfill the power demands, but also the risk of overcharging the battery 14 is minimal when its discharge limits are low.

After the ΔPwr signal is filtered, a battery overcharging prevention logic is introduced to the control system at 180. This is a final check to prevent overcharging of the battery 14 when increases in engine power are requested. The overcharging prevention function 180 is intended as a one-way regulation only, for preventing charging violations by reducing engine power. This effectively clips the filtered ΔPwr if the increase in engine output would result in overcharging of the battery 14 due to high generation of electric power in the generator 32. The overcharge adjustment is not necessary so long as the battery power stays within the allowable limits. However, if a charging violation ($P_{bat} > P_{bat\_charge\_limit}$) is detected, a PI controller will reduce the engine power correspondingly. In another embodiment, the controller temporarily closes a switch from the generator 32 to the battery 14 until the charging violation is no longer detected. After overcharging prevention function 180, the end result of the control algorithm is the total engine power adjustment 182.

Referring to FIGS. 2 and 4, the total engine power adjustment 182 of FIG. 4 corresponds to the engine power adjustment 126 of FIG. 2. Further engine torque and engine speed filtering adjustments are made at 128, which is after and separate from the total engine power adjustment 126, 182. The filtering at 128 does not filter the ΔPwr signal, but rather filters the raw engine torque and speed requests. This gains yet additional freedom to speed up the engine response when the battery 14 has a low discharge limit.

The engine speed and torque filters are again scheduled as functions of a ΔDischargPwr, which represents the difference between the instant discharge limit and the normal discharge limit of the battery. Multipliers, or scaling factors, are used in conjunction with filter constants to further accelerate the engine speed and engine torque filtering. For example, as the multipliers increases, the filter constant is amplified so that the engine 18 will provide power faster and the generator 32 will in turn generate power faster. The multipliers may be determined by two calibration tables, one for the engine speed filter constants, and the other for the engine torque filter constants. The multipliers increase as the value of ΔDischargPwr increases, and the engine speed and torque filtering are sped up accordingly.

In sum, the total engine power adjustment 126 is an add-on term to the open loop and closed loop engine power determinations 100, 108. Even if the battery 14 has zero power available due to a failure, increases in driver power demands are met by quickly increasing the engine power to timely generate sufficient electric power through the generator 32. The increase in generated electric power enables the motor 16 to operate along its maximum torque envelope. In other words, even with low or no battery charge, the motor torque is maximized for the entire period of acceleration. Furthermore, the commanded engine torque and engine speed increases are filtered as a function of the battery discharge limit in order to scale up the speed of the engine response if the battery discharge limit is low. This algorithm improves the drivability of the vehicle. This is especially important in HEVs as they become more prevalent in the vehicle market, as it is demanded that HEVs accelerate like conventional non-HEVs.

While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are described as less desirable than other embodiments or prior art implementations with respect to one or more characteristics are not outside the scope of the disclosure and may be desirable for particular applications.

What is claimed is:

1. A method for controlling a vehicle having an engine, a generator drivably coupled to the engine, a traction motor electrically coupled to the generator and to an electrical storage device comprising:

while the engine is providing drive torque, increasing engine output to increase available traction motor torque at a rate that varies based on available power from the electrical energy storage device when driver demanded power exceeds a corresponding threshold, and wherein the rate of increase engine output varies based upon a difference between available power in the electrical energy storage device and a combination of desired motor power and desired generator power.

2. The method of claim 1, further comprising filtering the difference with a filter, wherein a magnitude of filtering is adjustable.

3. The method of claim 2, wherein the magnitude of filtering is adjusted based upon a discharge limit of the electrical storage device.

4. The method of claim 3, further comprising reducing the magnitude of filtering based upon a charge level of the electrical energy storage device being below a threshold.

5. The method of claim 1, further comprising inhibiting further increasing of the engine output based upon the available power in the electrical energy storage device exceeding a charge limit.

6. The method of claim 1, wherein the rate of increasing engine output varies inversely with the available power from the electrical energy storage device.

7. A vehicle, comprising:
an engine;
a generator drivably connected to the engine;
a battery electrically coupled to a motor and the generator; and
a controller configured to increase engine output to increase rotational speed of the generator and available motor torque while the engine is running, wherein a magnitude of the increase of engine output is based upon a difference between available power in the battery and desired power in the motor and generator.

8. The hybrid electric vehicle of claim 7, generator transmits additional electrical power to the motor based on the increase of the output of the engine, such that the motor has a power output that exceeds the available power in the electrical energy storage device.

9. The hybrid electric vehicle of claim 7, wherein the generator and the motor are one integrated machine.

10. The hybrid electric vehicle of claim 7, wherein the controller is further configured to filter the difference by an intensity that is based upon a discharge limit of the electrical energy storage device.

11. The hybrid electric vehicle of claim 7, further comprising a transmission that includes a planetary gear set that drivably couples the engine to the generator such that the increase in output of the engine increases the rotational speed of the planetary gearset and generator to generate an increased amount of electrical power.

12. The hybrid electric vehicle of claim 7, wherein the generator and the motor are one integrated machine, and wherein the engine, the machine, and the transmission are selectively coupled in series by clutches.

13. A computer system for controlling an engine in a hybrid electric vehicle comprising:
a controller communicatively coupled to an engine and programmed to
transmit power to wheels of the vehicle from both an engine and a traction motor; and
while engine power is transmitting, increase engine power, to increase available traction motor torque, at a rate that varies based on available power from an electrical energy storage device when driver demands exceed a corresponding threshold.

14. The computer system of claim 13, wherein the increase of the engine power increases an available power output of the motor, such that the motor has an available power output that exceeds the available power in the electrical energy storage device.

15. The computer system of claim 13, wherein the engine is drivably coupled to a generator, and wherein the rate of increasing of the engine power varies based upon a difference between available power in the electrical energy storage device and a combination of desired motor power and desired generator power.

16. The computer system of claim 13, wherein the rate of increasing the engine power varies inversely with the available power from the electrical energy storage device.

* * * * *